(12) United States Patent
Fu et al.

(10) Patent No.: US 9,560,362 B2
(45) Date of Patent: Jan. 31, 2017

(54) METHOD AND APPARATUS OF TEXTURE IMAGE COMPRESSION IN 3D VIDEO CODING

(71) Applicant: MEDIATEK INC., Hsin-Chu (TW)

(72) Inventors: Chih-Ming Fu, Hsinchu (TW); Yi-Wen Chen, Taichung (TW); Chih-Wei Hsu, Taipei (TW)

(73) Assignee: MEDIATEK INC., Hsinchu (TW)

( * ) Notice: Subject to any disclaimer, the term of this patent is extended or adjusted under 35 U.S.C. 154(b) by 174 days.

(21) Appl. No.: 14/365,032

(22) PCT Filed: Dec. 14, 2012

(86) PCT No.: PCT/CN2012/086664
§ 371 (c)(1),
(2) Date: Jun. 12, 2014

(87) PCT Pub. No.: WO2013/091513
PCT Pub. Date: Jun. 27, 2013

(65) Prior Publication Data
US 2014/0328389 A1 Nov. 6, 2014

Related U.S. Application Data

(60) Provisional application No. 61/579,349, filed on Dec. 22, 2011, provisional application No. 61/721,690, filed on Nov. 2, 2012.

(51) Int. Cl.
*H04N 7/12* (2006.01)
*H04N 19/117* (2014.01)
(Continued)

(52) U.S. Cl.
CPC .......... *H04N 19/117* (2014.11); *H04N 19/136* (2014.11); *H04N 19/172* (2014.11);
(Continued)

(58) Field of Classification Search
CPC .. H04N 19/597; H04N 19/172; H04N 19/117; H04N 19/463; H04N 19/136; H04N 19/187; H04N 19/82
(Continued)

(56) References Cited

U.S. PATENT DOCUMENTS 8,823,821 B2 * 9/2014 Tian ................... H04N 7/181
348/218.1
2011/0292044 A1 * 12/2011 Kim ................... H04N 13/0011
345/419

(Continued)

FOREIGN PATENT DOCUMENTS

CN 101404766 A 4/2009
CN 101790092 A 7/2010

OTHER PUBLICATIONS

Fu, Chih-Ming et al. Sample Adaptive Offset for HEVC. Multimedia Signal Processing (MMSP), 2011 IEEE 13th International Workshop on. Oct. 17-19, 2011, p. 1-4, Figure 1.

*Primary Examiner* — Gims Philippe
*Assistant Examiner* — Richard Carter
(74) *Attorney, Agent, or Firm* — McClure, Qualey & Rodack, LLP (57) ABSTRACT

A method and apparatus for 3D video coding system are disclosed. Embodiments according to the present invention apply SAO process (sample adaptive offset process) to at least one dependent-view image of the processed multi-view images if processed multi-view images are received. Also embodiments according to the present invention apply the SAO process to at least one dependent-view image of the processed multi-view images or at least one depth map of the processed multi-view depth maps if both processed multi-view images and the processed multi-view depth maps are received. The SAO can be applied to each color component of the processed multi-view images or the processed multi-
(Continued)

view depth maps. The SAO parameters associated with a target region in one dependent-view image or in one depth map corresponding to one view may share or may be predicted by second SAO parameters associated with a source region corresponding to another view.

30 Claims, 10 Drawing Sheets

(51) Int. Cl.
*H04N 19/597* (2014.01)
*H04N 19/172* (2014.01)
*H04N 19/463* (2014.01)
*H04N 19/136* (2014.01)
*H04N 19/187* (2014.01)
*H04N 19/82* (2014.01)

(52) U.S. Cl.
CPC ......... *H04N 19/187* (2014.11); *H04N 19/463* (2014.11); *H04N 19/597* (2014.11); *H04N 19/82* (2014.11)

(58) Field of Classification Search
USPC .................................... 375/240.02, 240.16
See application file for complete search history.

(56) References Cited

U.S. PATENT DOCUMENTS

| 2013/0229485 | A1* | 9/2013 | Rusanovskyy | .... H04N 13/0048 348/43 |
| 2014/0294088 | A1* | 10/2014 | Sung | .................... H04N 19/597 375/240.16 |
| 2015/0172678 | A1* | 6/2015 | Alshina | ................. H04N 19/86 375/240.02 |

* cited by examiner

| coding_tree_unit( xCtb, yCtb ) { | Descriptor | |
|---|---|---|
| xCtb = ( CtbAddrRS % PicWidthInCtbsY ) << Log2CtbSizeY | | |
| yCtb = ( CtbAddrRS / PicHeightInCtbsY ) << Log2CtbSizeY | | |
| CtbAddrInSliceSeg = CtbAddrInRS − slice_segment_address | | |
| if( slice_sao_luma_flag \|\| slice_sao_chroma_flag ) | | |
| sao( xCtb >> Log2CtbSizeY, yCtb >> Log2CtbSizeY ) | | |
| coding_quadtree( xCtb, yCtb, Log2CtbSizeY, 0 ) | | |
| } | | |
| sao( rx, ry ){ | Descriptor | |
| if( rx > 0 ) { | | |
| leftCtbInSlice = CtbAddrInSlice > 0 | | |
| leftCtbInTile = TileId[ CtbAddrTS ] = = TileId[ CtbAddrRStoTS[ CtbAddrRS − 1 ] ] | | |
| if( leftCtbInSlice && leftCtbInTile ) | | |
| sao_merge_left_flag | ae(v) | } 510 |
| } | | |
| if( ry > 0 && !sao_merge_left_flag ) { | | |
| upCtbInSlice = (CtbAddrTS−CtbAddrRStoTS[CtbAddrRS − PicWidthInCtbs])<= CtbAddrInSlice | | |
| upCtbInTile = TileId[ CtbAddrTS ] = = TileId[ CtbAddrRStoTS[ CtbAddrRS − PicWidthInCtbs ] ] | | |
| if( upCtbInSlice && upCtbInTile ) | | |
| sao_merge_up_flag | ae(v) | } 520 |
| } | | |

Fig. 5A

| | |
|---|---|
| if( !sao_merge_up_flag && !sao_merge_left_flag ) { | |
|   for( cIdx = 0; cIdx < 3; cIdx++ ) { | |
|     if( ( slice_sao_luma_flag && cIdx == 0 ) \|\| ( slice_sao_chroma_flag && cIdx > 0 ) ) { | |
|       if( cIdx == 0 ) | |
|         sao_type_idx_luma | ae(v) ⎫ 530 |
|       if( cIdx == 1 ) | |
|         sao_type_idx_chroma | ae(v) ⎫ 540 |
|       if( SaoTypeIdx[ cIdx ][ rx ][ ry ] != 0 ) { | |
|         for( i = 0; i < 4; i++ ) | |
|           sao_offset_abs[ cIdx ][ rx ][ ry ][ i ] | ae(v) ⎫ 550 |
|         if( SaoTypeIdx[ cIdx ][ rx ][ ry ] == 1 ) { | |
|           for( i = 0; i < 4; i++ ) { | |
|             if( sao_offset_abs[ cIdx ][ rx ][ ry ][ i ] != 0 ) | |
|               sao_offset_sign[ cIdx ][ rx ][ ry ][ i ] | ae(v) ⎫ 560 |
|             sao_band_position[ cIdx ][ rx ][ ry ] | ae(v) ⎫ 570 |
|         } else { | |
|           if( cIdx == 0 ) | |
|             sao_eo_class_luma | ae(v) ⎫ 580 |
|           if( cIdx == 1 ) | |
|             sao_eo_class_chroma | ae(v) ⎫ 590 |
|         } | |
|       } | |
|     } | |
|     } | |
|   } | |
| } | |

METHOD AND APPARATUS OF TEXTURE IMAGE COMPRESSION IN 3D VIDEO CODING

CROSS REFERENCE TO RELATED APPLICATIONS

The present invention claims priority to U.S. Provisional Patent Application Ser. No. 61/579,349, filed Dec. 22, 2011, entitled "Sample Adaptive Offset for 3D Video Coding" and U.S. Provisional Patent Application Ser. No. 61/721,690, filed Nov. 2, 2012, entitled "Sample Adaptive Offset for 3D Video Coding". The U.S. Provisional Patent Applications are hereby incorporated by reference in their entireties.

TECHNICAL FIELD

The present invention relates to three-dimensional video coding. In particular, the present invention relates to 3D video coding incorporating sample adaptive offset.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of correlation of video data associated with multiple views and depth maps.

Figure 1:
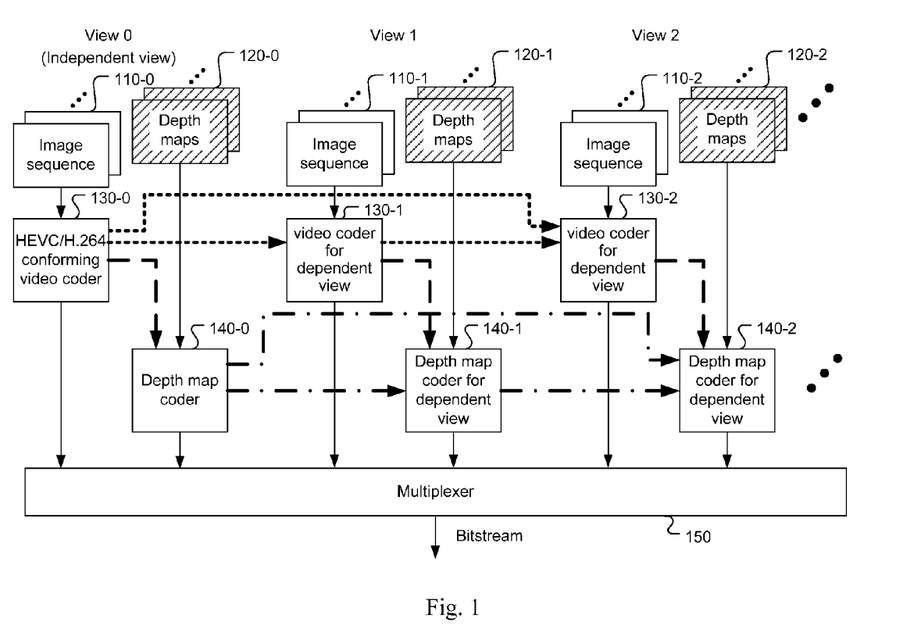
FIG. 1 illustrates an example of prediction structure for a 3D video coding system.

FIG. 1 illustrates generic prediction structure for 3D video coding. The incoming 3D video data consists of images (110-0, 110-1, 110-2, . . . ) corresponding to multiple views. The images collected for each view form an image sequence for the corresponding view. Usually, the image sequence 110-0 corresponding to a base view (also called an independent view) is coded independently by a video coder 130-0 conforming to a video coding standard such as H.264/AVC or HEVC (High Efficiency Video Coding). The video coders (130-1, 130-2, . . . ) for image sequences associated with dependent views (i.e., views 1, 2, . . . ) further utilize inter-view prediction in addition to temporal prediction. The inter-view predictions are indicated by the short-dashed lines in FIG. 1.

In order to support interactive applications, depth maps (120-0, 120-1, 120-2, . . . ) associated with a scene at respective views are also included in the video bitstream. In order to reduce data associated with the depth maps, the depth maps are compressed using depth map coder (140-0, 140-1, 140-2, . . . ) and the compressed depth map data is included in the bit stream as shown in FIG. 1. A multiplexer 150 is used to combine compressed data from image coders and depth map coders. The depth information can be used for synthesizing virtual views at selected intermediate viewpoints. To increase the coding efficiency, information sharing or prediction between textures (i.e., image sequences) and depths can also be utilized as indicated by long-dashed lines in FIG. 1. Furthermore, inter-view predictions as indicated by dotted-dashed lines can be used to code the depth maps for dependent views. An image corresponding to a selected view may be coded using inter-view prediction based on an image corresponding to another view. In this case, the image for the selected view is referred as dependent view. Similarly, a depth map for a selected view may be coded using inter-view prediction based on a depth map corresponding to another view. In this case, the depth map for the selected view is referred as dependent depth map. For color video, the depth maps associated with the chrominance (chroma) component may not need the same resolution as the luminance (luma) component. Therefore, the depth maps for color video may be coded in 4:0:0 sampling format, where the 4:0:0 sampling format refers to that only luma is sampled. The depth maps may be non-linearly scaled.

Figure 2A:
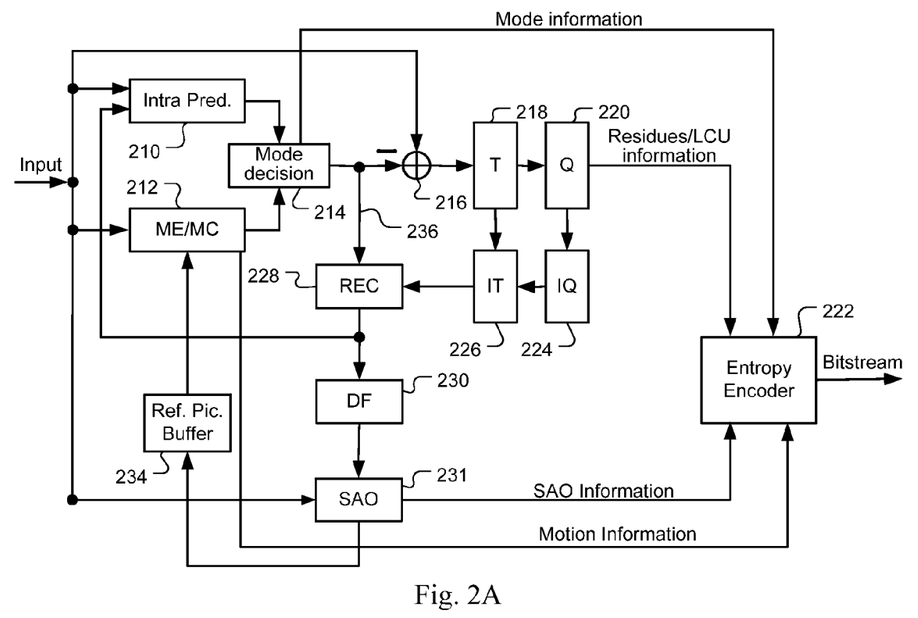
FIG. 2A illustrates an exemplary system block diagram of an encoder conforming to High Efficiency Video Coding (HEVC).
Figure 2B:
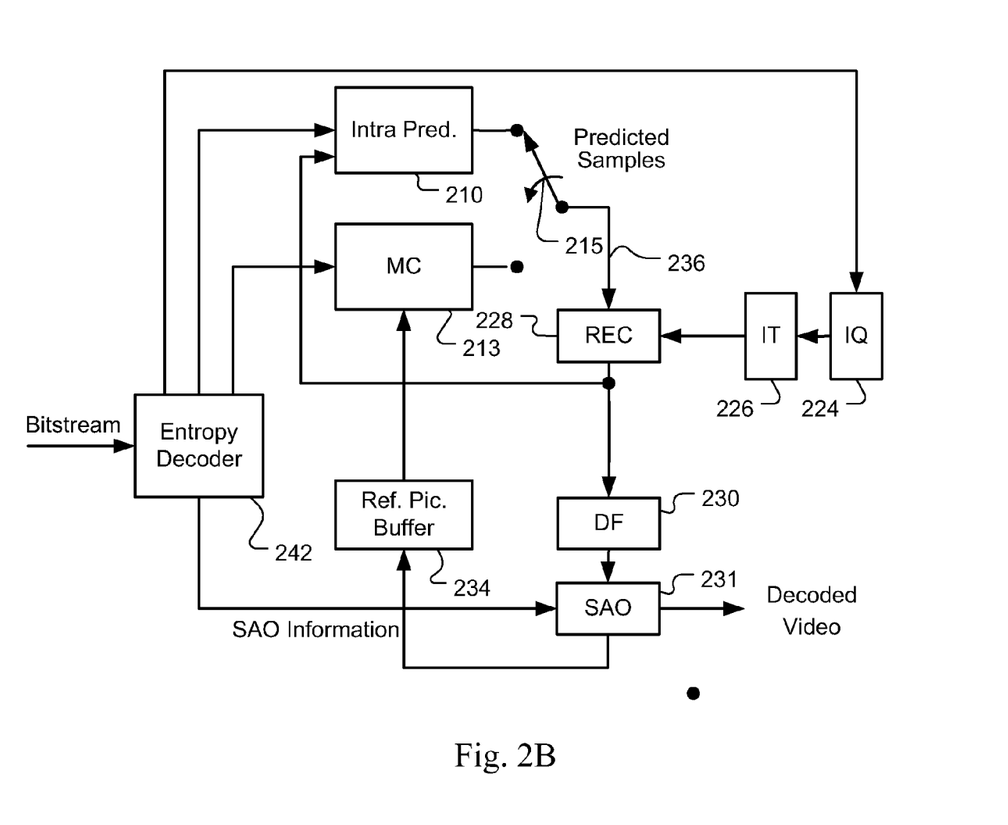
FIG. 2B illustrates an exemplary system block diagram of a decoder conforming to High Efficiency Video Coding (HEVC).

High-Efficiency Video Coding (HEVC) is a new international video coding standard that is developed by the Joint Collaborative Team on Video Coding (JCT-VC). In the HEVC, sample-adaptive offset (SAO) is a technique designed to reduce the distortion (intensity offset) of reconstructed pictures. SAO can be applied to individual color components such as luma and chroma components. FIGS. 2A-B illustrate exemplary system diagrams for an HEVC encoder and decoder respectively, where SAO 231 is applied to reconstructed video data processed by deblocking filter (DF) 230.

FIG. 2A illustrates an exemplary adaptive inter/intra video encoding system incorporating in-loop processing. For inter-prediction, Motion Estimation (ME)/Motion Compensation (MC) 212 is used to provide prediction data based on video data from other picture or pictures. Mode decision 214 selects Intra Prediction 210 or inter-prediction data 212 and the selected prediction data is supplied to Adder 216 to form prediction errors, also called residues. The prediction error is then processed by Transformation (T) 218 followed by Quantization (Q) 220. The transformed and quantized residues are then coded by Entropy Encoder 222 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 222 as shown in FIG. 2A. When an inter-prediction mode is used, a reference picture or pictures have to be reconstructed at the encoder end as well. Consequently, the transformed and quantized residues are processed by Inverse Quantization (IQ) 224 and Inverse Transformation (IT) 226 to recover the residues. The residues are then added back to prediction data 236 at Reconstruction (REC) 228 to reconstruct video data. The reconstructed video data may be stored in Reference Picture Buffer 234 and used for prediction of other frames.

As shown in FIG. 2A, incoming video data undergoes a series of processing in the encoding system. The reconstructed video data from REC 228 may be subject to various impairments due to a series of processing. Accordingly, various in-loop processing is applied to the reconstructed video data before the reconstructed video data are stored in the Reference Picture Buffer 234 in order to improve video quality. In the High Efficiency Video Coding (HEVC) standard being developed, Deblocking Filter (DF) 230 and Sample Adaptive Offset (SAO) 231 have been developed to enhance picture quality. Both Deblocking Filter (DF) 230 and Sample Adaptive Offset (SAO) 231 are referred as loop filters. SAO 231 is further referred as an adaptive filter since the filter operation is adaptive and filter information may have to be incorporated in the bitstream so that a decoder can properly recover the required information. Therefore, loop filter information from SAO is provided to Entropy Encoder 222 for incorporation into the bitstream. In FIG. 2A, DF 230 is applied to the reconstructed video first and SAO 231 is then applied to DF-processed video.

A corresponding decoder for the encoder of FIG. 2A is shown in FIG. 2B. The video bitstream is decoded by Video Decoder 242 to recover the transformed and quantized residues, SAO information and other system information. At the decoder side, only Motion Compensation (MC) 213 is performed instead of ME/MC. Switch 215 is used to select Intra prediction 210 or Inter prediction (i.e., motion compensation 213) according to the mode information. The decoding process is similar to the reconstruction loop at the encoder side. The recovered transformed and quantized residues, SAO information and other system information are used to reconstruct the video data. The reconstructed video is further processed by DF 230 and SAO 231 to produce the final enhanced decoded video. As shown in FIG. 2A and FIG. 2B, the DF and SAO are applied to reconstructed video data in a video encoder as well as a video decoder. In this case, when the SAO is applied to the reconstructed video data, the reconstructed video data may have been processed by the DF. For convenience, the reconstructed video data with or without additional processing (such as the DF) are referred as processed video data (such as processed multi-view images and processed multi-view depth maps). In software or hardware based implementation, the processed multi-view images and processed multi-view depth maps can be received from a media, such as memory, disk, and network. The processed multi-view images and processed multi-view depth maps may also be received from another processor.

The coding process in HEVC is applied to each image region named Largest Coding Unit (LCU). The LCU is adaptively partitioned into coding units using quadtree. The LCU is also called Coding Tree Block (CTB). For each leaf CU, DF is performed for each 8×8 block in HEVC. For each 8×8 block, horizontal filtering across vertical block boundaries is first applied, and then vertical filtering across horizontal block boundaries is applied.

Figure 3:
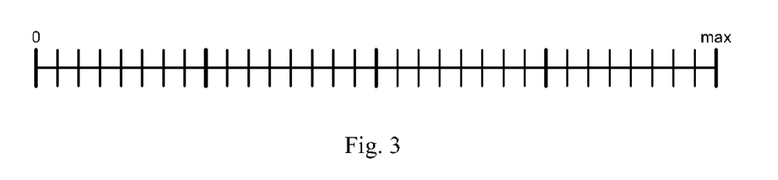
FIG. 3 illustrates band offset (BO) based sample adaptive offset (SAO) of HEVC, where the intensity is divided into 32 bands.
Figure 4:
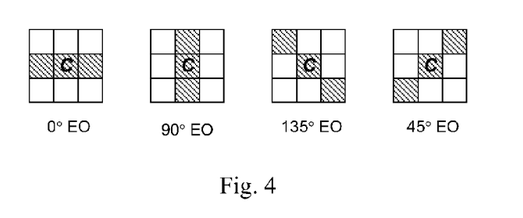
FIG. 4 illustrates edge offset (EO) based sample adaptive offset (SAO) of HEVC, where four edge classes corresponding to 0°, 90°, 135° and 45° are used.

SAO can be regarded as a special case of filtering, where the processing only applies to one pixel. In SAO, pixel classification is first done to classify pixels into different groups (also called categories or classes). The pixel classification for each pixel is based on a 3×3 window. Upon the classification of all pixels in a picture or a region, one offset is derived and transmitted for each group of pixels. In HEVC Test Model Version 4.0 (HM-4.0) or newer version, SAO is applied to luma and chroma components, and each of the luma components is independently processed. For SAO, one picture is divided into multiple LCU-aligned regions. Each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands as shown in FIG. 3. After pixel classification, one offset is derived for pixels of each band, and the offsets of center 16 bands or outer 16 bands are selected and coded. As for EO, it uses two neighboring pixels of a to-be-processed pixel to classify the pixel into a category. The four EO types correspond to 0°, 90°, 135°, and 45° as shown in FIG. 4. Similar to BO, one offset is derived for all pixels of each category except for category 0, where Category 0 is forced to use zero offset. Table 1 shows the EO pixel classification, where "C" denotes the pixel to be classified. Therefore, four offset values are coded for each coding tree block (CTB) or Largest Coding Unit (LCU) when EO types are used.

TABLE 1

| Category | Condition |
|---|---|
| 1 | C < two neighbors |
| 2 | C < one neighbor && C == one neighbor |
| 3 | C > one neighbor && C == one neighbor |
| 4 | C > two neighbors |
| 0 | None of the above |

Figure 5A:
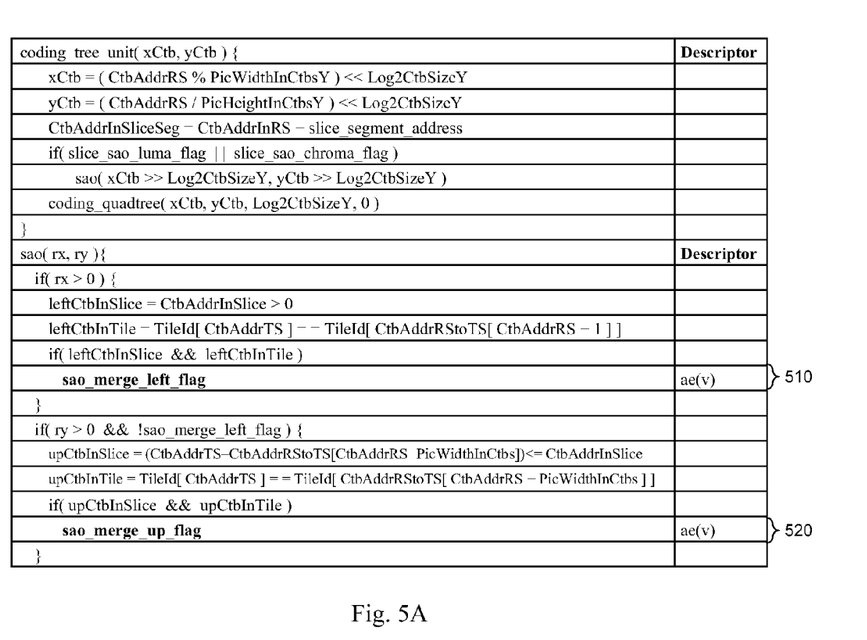
FIGS. 5A and 5B illustrate an exemplary syntax design for SAO as used in HEVC to convey SAO information.
Figure 5B:
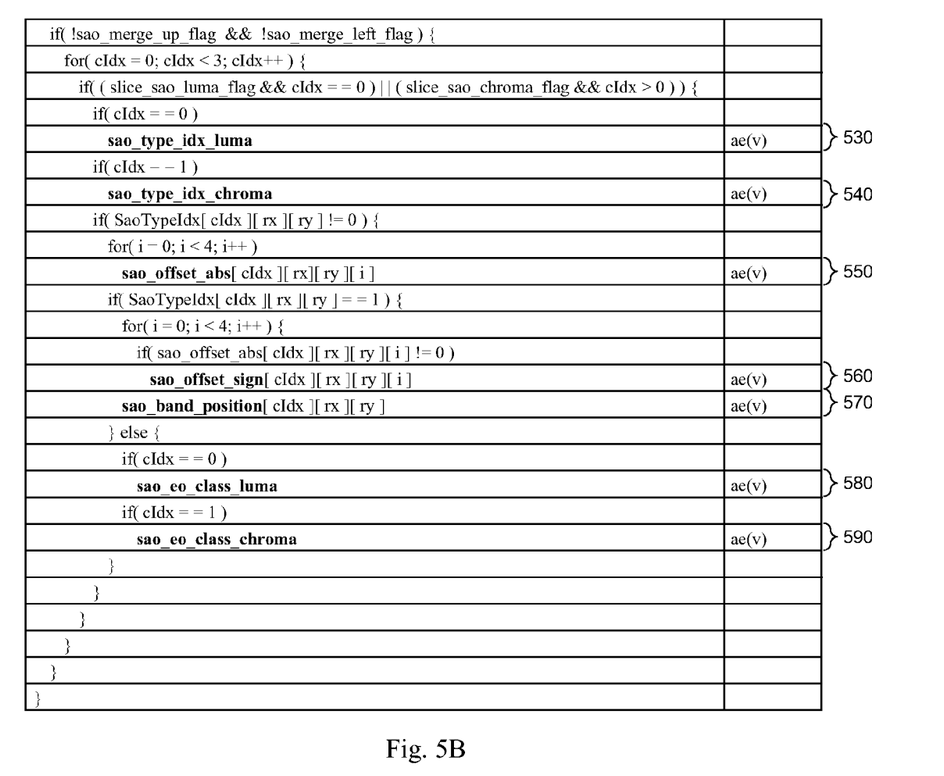

For each color component (luma or chroma), one picture is divided into CTB-aligned regions, and each region can select one SAO type among BO (with starting band position), four EO types (classes), and no processing (OFF). The total number of offset values in one picture depends on the number of region partitions and the SAO type selected by each CTB. The SAO syntax table and parameters are shown in FIG. 5A and FIG. 5B, where the syntax in FIG. 5B represents a continuation of syntax from FIG. 5A. The SAO merge Left and Up flags (i.e., sao_merge_left_flag and sao_merge_up_flag) are shown in lines 510 and 520 respectively. The syntax element sao_merge_left_flag indicates whether the current CTB reuses the parameters of left CTB. The syntax element sao_merge_up_flag indicates whether the current CTB reuses the parameters of upper CTB. The SAO type index from luma and chroma (i.e., sao_type_idx_luma and sao_type_idx_chroma) are shown in lines 530 and 540 respectively. The value of SAO is represented by magnitude and sign (i.e., sao_offset_abs and sao_offset_sign) as shown in lines 550 and 560 respectively. The band position (i.e., sao_band_position) of BO is indicated in line 570. The EO class for luma and chroma (i.e., sao_eo_class_luma and sao_class_chroma) are indicated in lines 580 and 590 respectively. The syntax element cIdx indicates one of three color components. While FIG. 5A and FIG. 5B illustrate the syntax design to convey the SAO information according to the HEVC standard, a person skilled in the art may use other syntax design to convey the SAO information.

Multi-view video may result in a large amount of data for storage or transmission. It is desirable to further improve the efficiency of three-dimensional video coding. The SAO coding tool has shown to improve video quality for conventional video compression. It is desirable to apply SAO to multi-view video to improve the coding efficiency.

SUMMARY

A method and apparatus for 3D video coding system are disclosed. Embodiments according to the present invention apply SAO process (sample adaptive offset process) to at least one dependent-view image of the processed multi-view images if processed multi-view images are received. Also embodiments according to the present invention apply the SAO process to at least one dependent-view image of the processed multi-view images or at least one depth map of the processed multi-view depth maps if both processed multi-view images and the processed multi-view depth maps are received. The SAO can be applied to each color component of the processed multi-view images or the processed multi-view depth maps. The SAO parameters associated with a target region in one dependent-view image or in one depth map corresponding to one view may share or may be predicted by second SAO parameters associated with a source region corresponding to another view.

One aspect of the present invention addresses means to determine the correspondence between the target region and the source region for SAO parameter prediction or sharing. In one embodiment, the source region is determined based on the target region and a DV (disparity vector) associated with the target region and the source region. Various means for deriving the DV are disclosed. In another embodiment, the target region and the source region are co-located regions. Various means for determining the correspondence of the two co-located regions are disclosed.

DETAILED DESCRIPTION

Embodiments of the present invention provide a method and apparatus for encoding and decoding of multi-view video incorporating the Sample Adaptive Offset (SAO) technique. According to the present invention, encoding and decoding multi-view images/depth maps utilize SAO process to improve system performance. The SAO can be used for 3D video coding to process dependent view images and/or multi-view depth maps. For the conventional 3D video coding system in FIG. 1, the base view (i.2., view 0) images are processed by an HEVC or H.264 conforming coder, where the coder may incorporate SAO process when an HEVC conforming coder is used. However, the coders for images of dependent views (i.e., views 1, 2, . . . ) and the coders for multi-view depth maps do not incorporate SAO process. Embodiments according to present invention apply SAO process to the dependent-view images and/or multi-view depth maps. For a 3D system including multi-view images, embodiments according to the present invention apply the SAO process to the dependent-view images.

Figure 6:
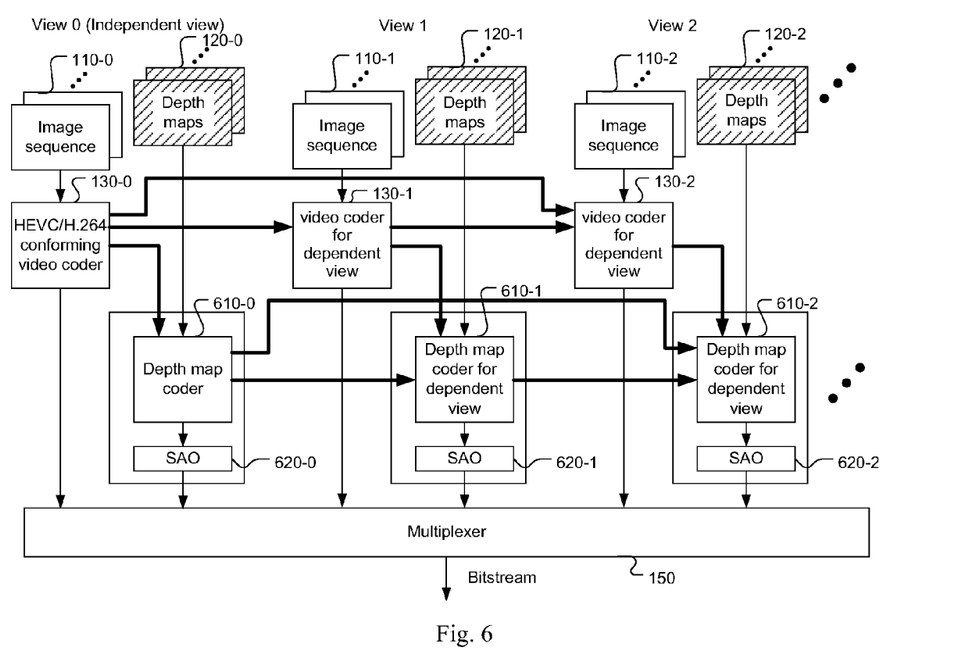
FIG. 6 illustrates an example of SAO for 3D video coding according to an embodiment of the present invention, where the SAO process is applied to multi-view depth maps.

FIG. 6 illustrates an example of applying SAO to the multi-view depth maps. The depth maps of each view are coded by a depth map coder (610-0, 610-1, 610-2, . . . ) with SAO process (620-0, 620-1, 620-2, . . . ). Similar to HEVC, each picture (i.e., each depth map) or slice can be divided into multiple regions by using the local adaptation technique and each region has its own SAO parameters. The regions can be divided using quadtree-division or Coding Tree Block (CTB) blocks and the region boundaries can be CTB aligned. A system structure for a 3D video decoder corresponding to the encoder in FIG. 6 can be determined accordingly and is shown in this disclosure. The depth map can be represented by an "internal" value or an "external" value. The "internal" value is also referred as domain of internal depth value, which is the representation for coding. On the other hand, the "external" value is referred as domain of external depth value, which is the representation for an object distance from near to far. In light of the alternative representations of depth map values, SAO can be selectively applied to the domain of internal depth value or the domain of external depth value.

Figure 7:
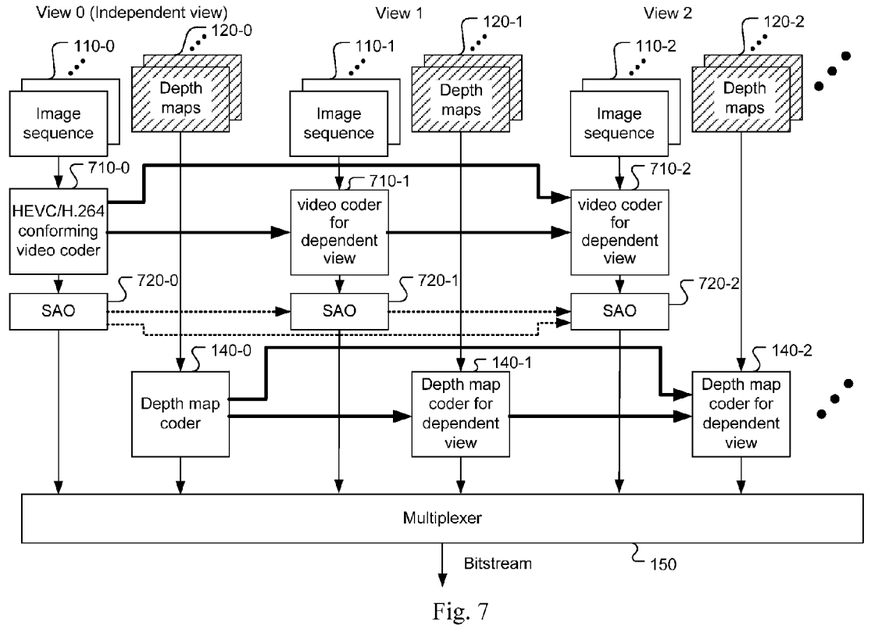
FIG. 7 illustrates another example of SAO for 3D video coding according to an embodiment of the present invention, where the SAO process is applied to dependent-view images.

To further reduce the side information of SAO, the SAO parameters for a target region can share or can be derived or predicted from the SAO parameters for a source region according to one embodiment of the present invention. When two regions share SAO parameters, an SAO merge flag is used to signal the case. Therefore, SAO parameter sharing is also referred as SAO parameter merge. The target region and source region are rectangular blocks with the same size and shape. For example, the target region and source region can be an entire picture, a CTB or a 4×4 block. The predicted or shared SAO parameters can be the full SAO parameters or partial SAO parameters. The source region can be spatially neighboring regions, temporal co-located regions or the corresponding regions in other views of the target region. For example, the SAO offset values of a source region in the base view can be re-used by a target region of the dependent views as shown in FIG. 7, where SAO (720-0, 720-1, 720-2, . . . ) is explicitly shown for each video coder (710-0, 710-1, 710-2, . . . ). The dashed lines between two SAOs indicate the SAO information sharing or prediction between the two respective SAO blocks.

Furthermore, the texture of an image in multiple views may be similar and it makes sense to share the information of SAO merge flag and SAO type between views. In this case, the SAO merge flags and SAO types of the base view will be re-used by the dependent views. The lighting condition between views may exhibit some correlation. However, the intensity may be quite different for corresponding locations. Therefore, there is still a need to transmit offset values of dependent views and only use the offset values of the base view to predict the offset values of the dependent views to reduce the required side information. Accordingly, only the offset difference will be signaled. To provide flexibility as well as options for different video coding profile, a flag can be used to enable/disable the prediction or sharing of SAO parameters. For example, a flag to indicate whether SAO parameter sharing is on/off can be incorporated in the CU level, CTB level, slice header, picture parameter set, adaptation parameter set, picture parameters set, sequence parameter set or video parameter set.

Figure 8A:
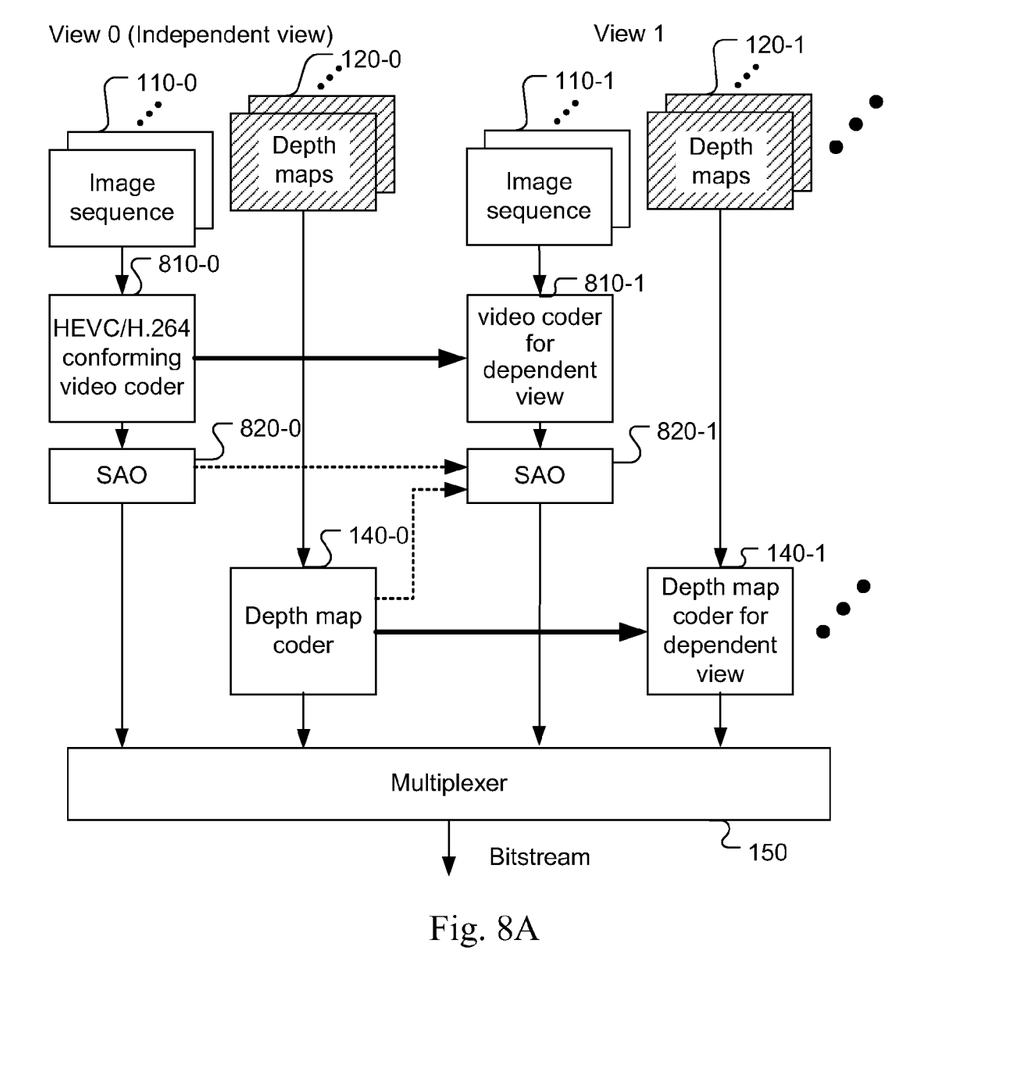
FIG. 8A illustrates yet another example of SAO for 3D video coding according to an embodiment of the present invention, where the SAO parameters are shared by two regions of two images from different views.
Figure 8B:
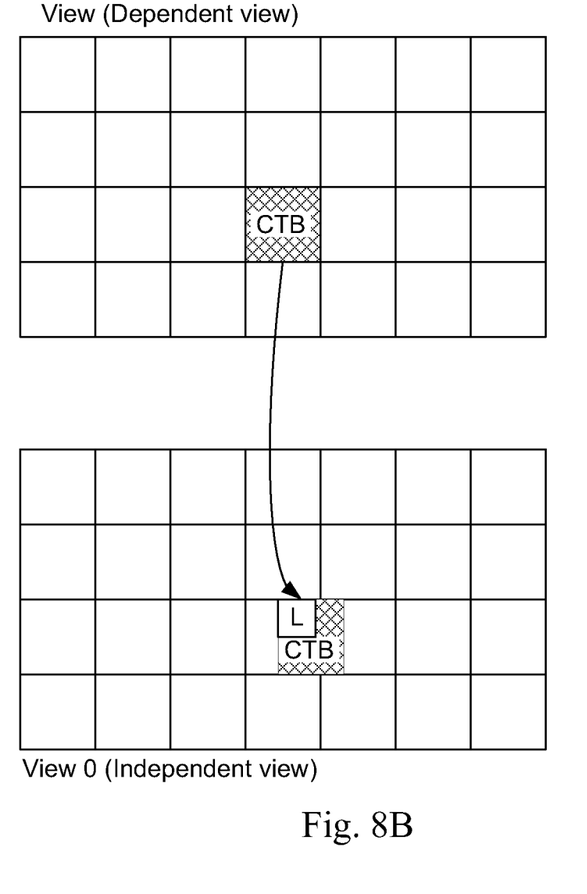
FIGS. 8B and 8C illustrate examples of determining the correspondence between two regions using associated depth information.

A selected region in a view may have a corresponding co-located region in another view. The mapping between the selected region in one view and the corresponding co-located region in another view can be determined using a disparity vector (DV) associated with the selected regions as shown in FIG. 8A and FIG. 8B. FIG. 8A illustrates an example of a 3D video coding system incorporating an embodiment of the present invention. As shown in FIG. 8A, the SAO 820-1 of view 1 for a selected region can use the SAO information for a corresponding co-located region of the SAO 820-0. However, the two regions are from different views and the mapping between the two regions has to be "warped" according to an associated disparity vector as shown in FIG. 8B. The disparity vector can be derived based on information provided by depth map coder 140-0. Again, SAO 820-0 and SAO 820-1 are shown explicitly as part of respective video coders 810-0 and 810-1. There are various means to obtain the DV. For example, the DV can be explicitly transmitted, derived from the disparity vectors of spatial neighboring blocks (temporal blocks), derived from the DV used for other inter-view prediction coding tools (e.g. inter-view motion parameter prediction or inter-view residual prediction), or derived from the associated depth map using depth to DV conversion and taking into account of camera parameters. A flag to enable/disable the SAO parameter warping can be inferred or transmitted in sequence level (e.g. sequence parameter set), view level (e.g. view parameter set, view header), picture level (e.g. picture parameter set, adaptive parameter set) or slice header.

After a corresponding region (source region) in another view is identified for a selected region (target region) in current view, various means can be used to acquire SAO parameters to predict or share the SAO parameters for the target region.

As an example, the SAO parameters of the top-left N×N block, top-right N×N block, bottom-left N×N block or bottom-right N×N block in the source region may be used. FIG. 8B illustrates an example where the corresponding source region covers multiple CTBs and the SAO parameters of 'L' block (the top-left block of the CTB) in the source region are selected to predict or share SAO parameters for the entire target CTB in the dependent view.

Figure 8C:
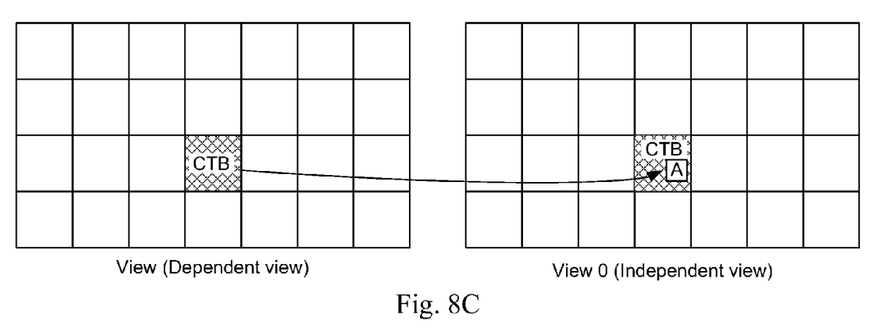

In another example, the SAO parameters of the center N×N block of the source region can be used. The center N×N block can be the N×N block located at above-left, above-right, bottom-left or bottom-right to the center of the source region. In the case that the source region covers multiple CTBs, the SAO parameters of block A (bottom-right block) in the source CTB can be used to predict or share SAO parameters for the entire target CTB as shown in FIG. 8C.

An N×N block can use the SAO parameters of a corresponding block in another view, where the N×N block is mapped to the corresponding N×N block in the other view using an associated DV. The corresponding N×N block is a subset of the CTB and each CTB may consist of multiple SAO parameter sets.

As another example, the SAO parameters covering the most area of the source region can be used for the target region if the source region covers multiple regions with different SAO parameters.

In yet another example, if the source region includes multiple sub-regions and each sub-region has its own SAO parameters, the target region will also be divided into multiple sub-regions according to source region divisions. The target sub-regions are mapped to the source sub-regions according to an associated global DV. Each sub-region in the target region will use the SAO parameters of the corresponding sub-region in the source region.

In another embodiment of the present invention, the depth map is used to generate a synthesized view. For example, if the depth information or disparity information is available, a system incorporating the present invention can generate or synthesize a picture corresponding to a new view point. In order to reduce the distortion of the synthesized view, the system can apply the sample adaptive offset to the synthesized picture to reduce the distortion between the synthesized picture and the original picture.

Figure 9:
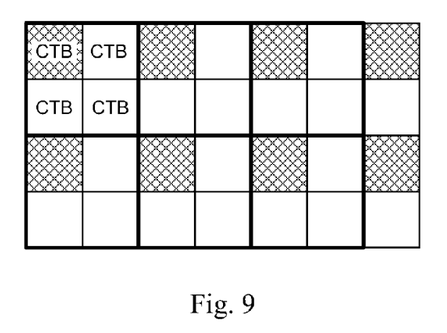
FIG. 9 illustrates an example of SAO parameter compression using subsampling, where the SAO parameters for one out of coding tree blocks are stored.

When the SAO parameters of the base view are shared by the dependent views, the SAO parameters of an entire picture or slice have to be stored for future pictures (dependent-view images or depth maps) to use. However, this will require an additional buffer to store the SAO parameters which will increase the hardware/software cost. To reduce the memory requirement, SAO parameter compression is performed according to yet another embodiment of the present invention. The SAO parameters of a base view are down-sampled in a system incorporating an embodiment of the present invention. For example, only the SAO parameters corresponding to one representative CTB for every N CTBs need to be stored. The representative CTB can be any one within a compression unit associated with the SAO parameter compression. For example, if the SAO parameters compression unit is four CTBs (i.e., N=4), the size of SAO parameter buffer is reduced by a factor of 4. FIG. 9 illustrates an example of SAO parameter compression, where each SAO parameter compression unit (indicated by a thick square) consists of 4 CTBs. For each compression unit, the SAO parameters associated with the upper-left CTB (indicated by a shaded area) is shared by all the CTBs within the compression unit. In another embodiment, partial SAO information such as merge-left-flag, merge-up-flag and SAO type can be shared instead of the entire set of SAO parameters. In this case, there is no need to store the offset values for a compression unit if the merge flag for the compression unit indicates the compression unit is merged. SAO information re-use or sharing is based on the assumption that the picture shapes and textures from different views are similar while the correlation of lighting condition or quantized coefficients between views is low. For example, if there is an object in the center of the picture in one view, it has a high probability that there will be the same object near the center in the other view.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional video coding, the method comprising:
receiving processed multi-view images or both the processed multi-view images and processed multi-view depth maps from a media or a processor;
applying SAO process (sample adaptive offset process) to at least one dependent-view image of the processed multi-view images if the processed multi-view images are received; and
applying the SAO process to at least one dependent-view image of the processed multi-view images or at least one depth map of the processed multi-view depth maps if both the processed multi-view images and the processed multi-view depth maps are received, wherein first SAO parameters associated with a target region are generated based on second SAO parameters associated with a source region, wherein the first SAO parameters are generated by reusing at least a portion of the second SAO parameters or by predicting the first SAO parameters from the second SAO parameters.

2. The method of claim 1, wherein the processed multi-view images or the processed multi-view depth maps are associated with a color component of video data.

3. The method of claim 1, wherein the processed multi-view depth maps are associated with luma component and chroma components of color video data in 4:0:0 sampling format and the SAO process is applied to the luma component only.

4. The method of claim 1, wherein the first SAO parameters associated with the target region correspond to a first image of said at least one dependent-view image, wherein the second SAO parameters associated with the source region correspond to a second image corresponding to another view, wherein a first depth map of said at least one depth map reuses or is predicted by
a second depth map of said at least one depth map corresponding to another view,
wherein said another view is different from a first view associated with the first image or the first depth map.

5. The method of claim 4, wherein the target region and the source region are selected from a group comprising an entire image, a CTB (Coding Tree Block), and a 4×4 block.

6. The method of claim 4, wherein the source region is determined based on the target region and a DV (disparity vector) associated with the target region and the source region.

7. The method of claim 6, wherein information related to the DV is incorporated in video bitstream for the three-dimensional video coding.

8. The method of claim 6, wherein the DV is derived based on one or more DVs associated with spatial neighboring blocks or temporal co-located blocks of the target region or the source region.

9. The method of claim 6, wherein the DV is derived based on another DV associated with another inter-view prediction, wherein said another inter-view prediction comprises inter-view motion parameter prediction and inter-view residual prediction.

10. The method of claim 6, wherein the DV is derived based on an associated depth map using depth-to-DV conversion and camera parameters.

11. The method of claim 4, wherein the target region and the source region are co-located regions.

12. The method of claim 4, wherein the SAO parameters associated with top-left part of a CTB (Coding Tree Block), top-right part of the CTB, bottom-left part of the CTB or bottom-right part of the CTB are used as the second SAO parameters, and wherein the CTB is within the source region.

13. The method of claim 4, wherein the SAO parameters associated with a center CTB (Coding Tree Block) of the source region are used as the second SAO parameters, and wherein the center CTB is aligned with a smallest coding unit of the source region.

14. The method of claim 4, wherein an additional syntax element is used to indicate which view is used for SAO parameter prediction or sharing.

15. The method of claim 14, wherein the additional syntax element is incorporated in a sequence level, a view level, a picture level, a slice level or a CTB level (Coding Tree Block level).

16. The method of claim 4, wherein an additional syntax element is used to indicate whether SAO parameter prediction or sharing is enabled or disabled.

17. The method of claim 16, wherein the additional syntax element is incorporated in a sequence level, a view level, a picture level, a slice level or a CTB level (Coding Tree Block level).

18. The method of claim 4, wherein the first SAO parameters and the second SAO parameters correspond to partial SAO parameters.

19. The method of claim 18, wherein the partial SAO parameters consist of syntax elements related to SAO parameter merging information and SAO type, and wherein the syntax elements comprise sao_merge_left_flag, sao_merge_up_flag, sao_type_idx_luma, sao_type_idx_chroma, sao_eo_class_luma, and sao_eo_class_chroma.

20. The method of claim 18, wherein the partial SAO parameters consist of syntax elements related to SAO parameter merging information, and wherein the syntax elements comprise sao_merge_left_flag and sao_merge_up_flag.

21. The method of claim 18, wherein the partial SAO parameters consist of syntax elements related to SAO type, and wherein the syntax elements comprise sao_type_idx_luma sao_type_idx_chroma, sao_eo_class_luma, and sao_eo_class_chroma.

22. The method of claim 18, wherein the partial SAO parameters consist of syntax elements related to SAO offset values and wherein the syntax elements comprise sao_offset_abs, sao_offset_sign, and sao_band_position.

23. The method of claim 18, wherein the partial SAO parameters correspond to any combination of sao_merge_up_flag, sao_merge_left_flag, sao_type_idx_luma, sao_type_idx_chroma, sao_eo_class_luma, sao_eo_class_chrom, and sao_band_position.

24. The method of claim 4, wherein the second SAO parameters are buffered and the second image is associated with a base view.

25. The method of claim 24, wherein the second SAO parameters are buffered in a compressed form.

26. The method of claim 25, wherein the compressed form is generated based on down sampling.

27. The method of claim 24, wherein partial second SAO parameters are buffered.

28. The method of claim 1, wherein a flag to enable or disable the SAO process is incorporated in video bitstream for the three-dimensional video coding.

29. The method of claim 1, further comprising applying the SAO process to a virtual reference image, wherein the virtual reference image is generating using view synthesis based on video data associated with the processed multi-view images or the processed multi-view depth maps.

30. An apparatus for three-dimensional video coding, the apparatus comprising at least one circuit configured for:
- receiving processed multi-view images or both the processed multi-view images and processed multi-view depth maps from a media or a processor;
- applying SAO process (sample adaptive offset process) to at least one dependent-view image of the processed multi-view images if the processed multi-view images are received; and
- applying SAO process to at least one dependent-view image or at least one depth map of the processed multi-view depth maps if both the processed multi-view images and the processed multi-view depth maps are received, wherein first SAO parameters associated with a target region are generated based on second SAO parameters associated with a source region, wherein the first SAO parameters are generated by reusing the second SAO parameters or by predicting the first SAO parameters from the second SAO parameters.

* * * * *